United States Patent

[11] 3,573,498

[72] Inventor Richard W. Ahrons
Somerville, N.J.

[21] Appl. No. 685,376
[22] Filed Nov. 24, 1967
[45] Patented Apr. 6, 1971
[73] Assignee RCA Corporation

[54] COUNTER OR SHIFT REGISTER STAGE HAVING BOTH STATIC AND DYNAMIC STORAGE CIRCUITS
7 Claims, 4 Drawing Figs.

[52] U.S. Cl. .......... 307/238, 307/205, 307/208, 307/251, 307/279
[51] Int. Cl. .......... G11c 11/34
[50] Field of Search .......... 307/205, 251, 279, 304, 208, 238; 328/42

[56] References Cited

UNITED STATES PATENTS

| | | | |
|---|---|---|---|
| 3,243,600 | 3/1966 | Fatz | 328/42X |
| 3,260,863 | 7/1966 | Burns et al. | 307/205 |
| 3,267,295 | 8/1966 | Zuk | 307/205 |
| 3,395,292 | 7/1968 | Bogert | 307/304X |
| 3,431,433 | 3/1969 | Ball et al. | 307/251X |
| 3,363,115 | 1/1968 | Stephenson et al. | 307/291X |
| 3,483,400 | 12/1969 | Washizuka et al. | 307/279 |

OTHER REFERENCES

Millman & Taub, Pulse Digital & Switching Waveforms, 1965 p-7— 8.

*Primary Examiner*—John S. Heyman
*Attorney*—H. Christoffersen

ABSTRACT: Signal translating stages which are useful in shift register applications are described. The signal translating stage is shown, in one example, to be constructed of complementary IGFET devices and, in another example, of single conductivity type IGFET devices. In either example, the shift register stage includes a flip-flop storage circuit and an inverter input capacitance node storage circuit which are operatively coupled and decoupled under the control of clock signals to translate information from the input to the output of the stage.

INVENTOR
Richard W. Ahrons

BY Robert R. Hubbard
ATTORNEY

Patented April 6, 1971 3,573,498

2 Sheets-Sheet 2

INVENTOR
Richard W. Ahrons

BY Robert R. Hubbard
ATTORNEY

COUNTER OR SHIFT REGISTER STAGE HAVING BOTH STATIC AND DYNAMIC STORAGE CIRCUITS

BACKGROUND REFERENCES

A U.S. Pat. No. 3,322,974, issued May 30, 1967 to R. W. Ahrons et al. for FLIP-FLOP ADAPTABLE FOR COUNTER COMPRISING INVERTERS AND INHIBITABLE GATES AND IN COOPERATION WITH OVERLAPPING CLOCKS FOR TEMPORARILY MAINTAINING COMPLEMENTARY OUTPUTS AT SAME DIGITAL LEVEL describes inverter and transmission devices with which the signal translating stage of the present invention may be implemented. A copending U.S. application, Ser. No. 515,413 filed Dec. 21, 1965, by J. R. Burns et al. for TRANSMISSION GATE, and assigned to the present assignee, describes transmission devices which may be employed to implement signal translating stages according to the present invention.

BACKGROUND OF THE INVENTION

The present invention relates to signal translating stages useful, for example, in shift registers and other apparatus. Shift registers generally include a plurality of cascaded stages, with each stage including primary and secondary storage elements. The primary storage element in each stage holds the information. Upon a clock signal command the information in each stage is shifted to the secondary storage element of the next succeeding stage. On the next clock signal command the information is shifted from each secondary element to the primary storage element in these succeeding stages. Timing problems (sometimes called race or ripple-through) are eliminated by this two-step process which decouples the primary storage elements from each other.

In many prior art shift register stages both the primary and the secondary storage elements are comprised of bistable multivibrators (flip-flops). Each flip-flop requires at least two inverter elements or a total of four inverter elements per stage. When this type of shift register stage is implemented in integrated circuit form (as for example, with insulated gate field-effect transistors), at least four transistor inverter devices and four load devices are required to implement the four inverters. The substrate area required to fabricate the four inverter type shift register stage is relatively large such that the number of stages which can be placed on a substrate or chip is relatively limited.

In order to fabricate more shift register stages on a substrate, dynamic (clocked) shift register stages have been employed. Each dynamic stage utilizes the input capacitance nodes of two cascaded inverters for the primary and secondary storage. Thus, a dynamic shift register is comprised of a plurality of cascaded inverter devices. Separate transmission gate devices are employed to isolate the input capacitance node of each inverter from the output of the preceding inverter in the cascaded chain. During a first time interval *T1* the transmission gate devices which are coupled to the input capacitance nodes of the secondary storage inverters in each stage are closed; and the transmission gate devices which are coupled to the input capacitance nodes of the primary storage inverters in each stage are open. The opposite condition prevails during a second time interval *T2*. During the off time for any of the transmission devices, the charge on the associated input capacitance node slowly changes due to leakage of the transmission device. Consequently, the capacitance storage has a limit in time, i.e., a maximum time for each of the *T1* and *T2* time intervals. These maximum times determine the lowest repetition rate for the shift register.

An object of the present invention is to provide a new and improved signal translating stage.

Another object of the present invention is to provide a shift register stage which employs three inverters connected in a configuration which has some of the benefits attributed to both the static and the dynamic types of shift registers.

BRIEF SUMMARY OF THE INVENTION

According to the examples of the invention, there is provided a signal translating stage which is operable during first and second consecutive time intervals to translate information signals from the input to the output of the stage. The stage includes a first storage circuit which has first and second inverters cross-coupled to form a flip-flop with an input and an output. The stage further includes a second storage circuit having a third inverter with an input capacitance node and an output. Transmission gate means is provided for coupling the input of one of the first and second storage circuits to the input of the stage only during the first time interval and for coupling the output of this one storage circuit to the input of the other storage circuit only during the second time interval.

According to one embodiment of the invention, the storage circuit which is coupled to the input of the stage during the first time interval is the flip-flop storage circuit; and the input capacitance node of the third inverter is coupled to the output of the flip-flop storage circuit during the second time interval.

In another embodiment of the invention the roles of the first and second storage circuits are interchanged with one another.

For any of the above described embodiments, the inverters and transmission devices may be implemented with insulated gate field effect transistors (IGFETs) either of all the same conductivity or of opposite conductivity types.

BRIEF DESCRIPTION OF THE DRAWINGS

In the accompanying drawings, like reference characters denote like components and.

DETAILED DESCRIPTION

Figure 1:
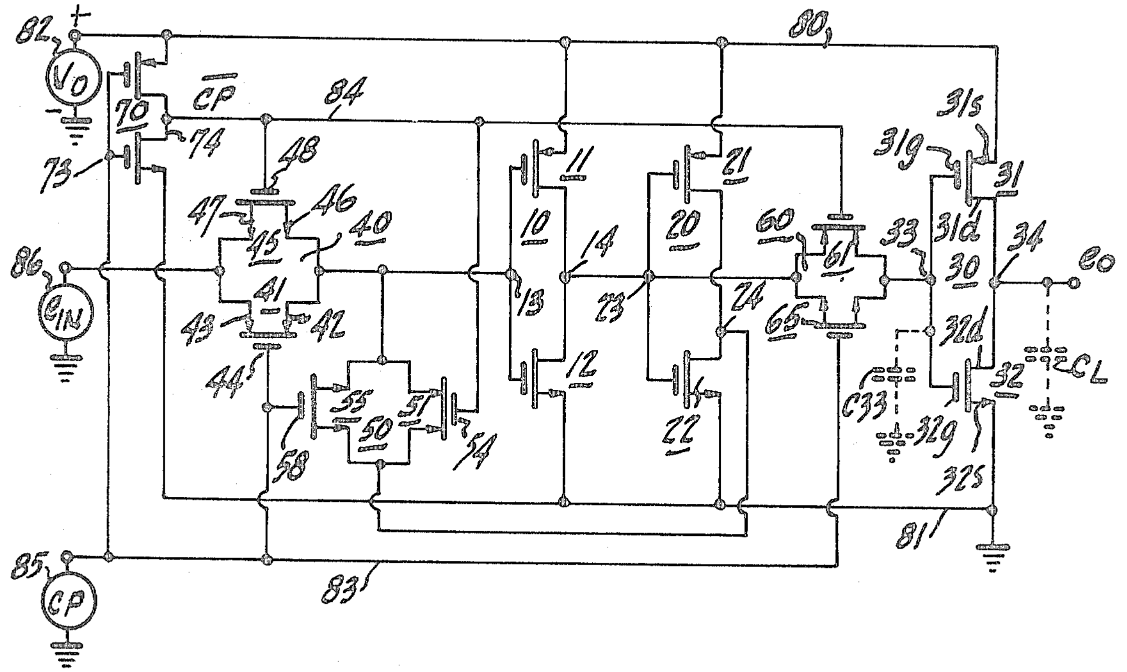
FIG. 1 is a circuit diagram of one example of a signal translating stage according to the invention employing complementary IGFET inverters and transmission devices.

The signal translating stages of the present invention may be constructed with discrete components or by means of integrated circuit processes. As used herein, the term "integrated circuit" refers to those technologies by which an entire circuit (or circuits) can be formed as by diffusion or thin films in or on one or more substrates (or chips) of materials, such as silicon, glass, sapphire and the like. By way of example and completeness of description, the invention is illustrated with IGFET devices which for some examples are complementary (of opposite conductivity types) and for other examples are of one conductivity type only. It is noted at this point that the semiconductor material can be any suitable material which is generally employed to make insulated gate field-effect devices in the semiconductor art. For the purpose of the description which follows, all semiconductor materials will be assumed to be silicon unless otherwise specified.

For the complementary IGFET examples of the invention, a P-type unit will be identified on the drawing by an arrowhead on the source lead pointing toward the unit. On the other hand, an N-type unit will be identified with an arrowhead on the source lead pointing away from the unit. When an IGFET device is employed as a transmission gate, the arrowheads will be employed for both of the conduction channel leads as the source and drain functions are interchangeable for transmission device applications.

Referring now to FIG. 1, an example of a signal translating stage according to the present invention is shown to have three inverter devices 10, 20 and 30 and three transmission devices 40, 50 and 60. A fourth inverter 70 is employed to obtain the complement $\overline{CP}$ of the clock signal CP. Two of the inverters 10 and 20 are cross-coupled to form a flip-flop which serves as a first storage circuit. The input capacitance C33 of the input capacitance node 33 of the third inverter 30 provides the storage for the second storage circuit.

Each of the inverters 10, 20, 30, and 70 has a substantially similar circuit configuration. For these inverters the tens digit of the reference character identifies the inverter and the units digit identifies similar components, nodes and leads within the inverter. Consequently, only the inverter 30 will be described in any detail.

The inverter 30 is a complementary inverter which includes a P-type IGFET 31 and an N-type IGFET 32. The drain leads 31*d* and 32*d* are connected together at the output capacitance node 34 of the inverter 30. The gate leads 31*g* and 32*g* are connected together at the input capacitance node 33 of the inverter 30. The source lead 31*s* is connected to a first supply line 80 while the source lead 32*s* is connected to a second supply line 81. In a similar manner the source leads of the N-type transistors for each of the other inverters 10, 20 and 70 are connected to the supply line 81 while the source leads of the P-type IGFETs in the other inverters are connected to the supply line 80.

For the illustrated connections of the inverters 10, 20, 30 and 70 to the supply lines 80 and 81, the supply line 80 must be maintained positive relative to the supply line 81 in order to provide operating bias for the inverters. This operating bias may be obtained, for example, by means of a source 82 of direct current voltage having a value of $V_0$ volts. The absolute value $|V_0|$ is considered greater than the absolute values $|V_{TN}|$ and $|V_{TP}|$ of the threshold voltages for the N and P devices. The source 82 has its positive terminal connected to the supply line 80 and its negative terminal connected to a point of fixed reference potential, illustrated as circuit ground by the conventional symbol therefor. The supply line 81 is also connected to circuit ground.

The operating principles of complementary IGFET inverters are well described in the aforementioned Ahrons et al. patent. Suffice it to say here that when the input capacitance node is charged to a voltage, say $V_O$ volts, greater than the threshold $V_{TN}$ of the N-type IGFET, the N-type IGFET is turned on and the P-type IGFET is turned off. The output capacitance node then is at ground potential or zero volt. On the other hand, when the input capacitance node is at ground or zero volt, the N-type IGFET is turned off and the P-type IGFET is turned on. The output capacitance node then is charged to a value of $+V_O$ volts via the conduction path of the P-type IGFET.

Each of the transmission devices 40, 50 and 60 are also of substantially identical circuit configuration. For these transmission devices the tens digit identifies the transmission device; while the units digit identifies specific components and leads within the transmission device. Consequently, only the transmission device 40 will be described in detail.

Figure 2:
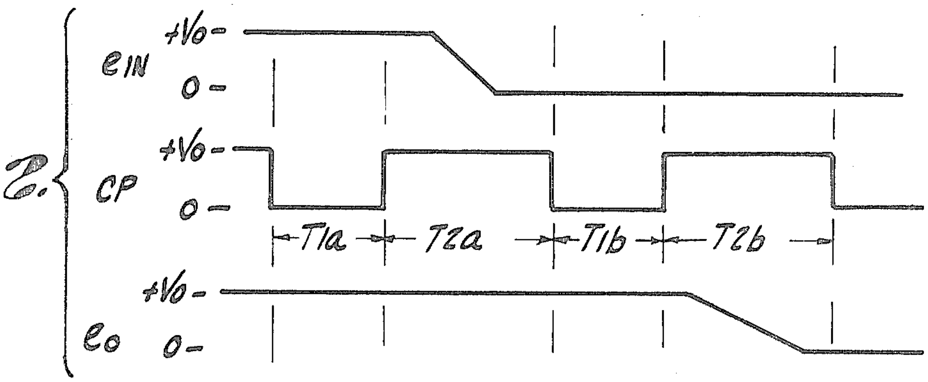
FIG. 2 is a waveform diagram illustrating the clock signal, the input signal and the output signal for the signal translating stage.

The transmission device 40 includes a P-type IGFET 41 and an N-type IGFET 45 arranged in a complementary transmission gate configuration. To this end, one of the source and drain leads 42 of IGFET 41 is connected to one of the source and drain leads 46 of the IGFET 45. The other of the source and drain leads 43 of IGFET 41 is connected to the other of the source and drain leads 47 of the IGFET 45. These connections effectively couple the conductive channels of the IGFET 41 and 45 in parallel and provide a symmetrical current carrying path. The gate lead 44 of the P-type IGFET is connected to a clock signal supply line 83 to receive a clock signal CP; while the gate lead 48 of the N-type IGFET 45 is connected to another clock signal supply line 84 to receive the clock signal complement $\overline{CP}$. The clock signal CP is applied between the clock signal supply line 83 and circuit ground by means of a source of clock signals 85. The clock signal source 85 may be any suitable circuit arrangement capable of providing clock signal waveforms of the type illustrated in FIG. 2. As illustrated in FIG. 2, the clock signal CP has a value of either 0 volt or $+V_O$ volts.

As mentioned previously, the clock signal complement $\overline{CP}$ is obtained via inverter 70. Thus inverter 70 has its input 73 coupled to the CP line 83 and its output 74 coupled to the $\overline{CP}$ line 84.

The operation of complementary IGFET transmission devices as well as the operation of a single IGFET transmission device is well described in the aforementioned Burns et al. application. Suffice it to say here that the transmission device is turned on and off by control signals applied to its gate lead (or leads for complementary devices) to connect and disconnect, respectively, an input signal source to a load. In the present application the clock signal CP and its complement $\overline{CP}$ control the transmission devices 40, 50 and 60. The transmission device 40, for example, is turned off when CP has a value of $+V_O$ volts and $\overline{CP}$ is zero volt, i.e., both the P- and N-type IGFETs 41 and 45 are turned off. On the other hand, when CP = 0 volt and $\overline{CP} = +V_O$ volts, both IGFETs 41 and 45 are turned on.

The transmission device 40 is utilized to couple and decouple a source of input signals 86 (also designated $e_{in}$) to and from the input capacitance node 13 of the inverter 10. To this end, the current path of the transmission device 40 is coupled between one terminal of the source 86 and the input capacitance node 13.

The transmission device 50 is utilized to couple or lock the inverters 10 and 20 into a flip-flop storage circuit and also to decouple the flip-flop storage circuit when information is being transferred thereto. To this end, the current path of the transmission device 50 is connected between the input capacitance node 13 of inverter 10 and the output capacitance node 24 of inverter 20. The gate lead 58 of the N-type IGFET 55 is connected to the CP clock line 83; and the gate lead 54 of the P-type IGFET 51 is connected to the $\overline{CP}$ clock line 84. The output capacitance node 14 of the inverter 10 is connected to the input capacitance node 23 of the inverter 20 to complete the cross-coupling loops.

The transmission device 60 is utilized to couple and decouple the output of the first storage circuit (flip-flop) to and from the input capacitance node 33 of the inverter 30 in the second storage circuit. To this end, the current path of transmission device 60 is connected between the output capacitance node 14 of the inverter 10 and the input capacitance node 33 of inverter 30.

The source 86 of input signals $e_{in}$ may be any suitable circuit configuration capable of generating signals having values of either 0 volt or $+V_O$ volts, as illustrated in FIG. 2. For example, in shift register applications where a plurality of signal translating stages are connected in cascade, the source 86 for a particular stage would be the stage which precedes it. It should also be noted at this point that the load capacitance $C_L$ (shown by the dashed connection to the output 34 of inverter 30) represents not only the output node capacitance of inverter 30 but also the input capacitance of the next succeeding stage.

For the operation of the FIG. 1 signal translating stage, reference is made to the waveform diagrams in FIG. 2. The clock signal cycle is there shown to comprise first and second successive and nonoverlapping or consecutive time intervals. Two cycles of the clock are illustrated with the intervals in the first cycle being designated *T1a* and *T2a* and in the second cycle being designated *T1b* and *T2b*.

Prior to the interval *T1a*, the clock signal CP is at the higher value of $+V_O$ volts. The inverter 70 inverts the CP clock signal to provide the complement $\overline{CP}$ on the line 84. For the condition of the clock signal just prior to *T1a*, the transmission gate 40 is biased off whereby the input capacitance node 13 of inverter 10 is decoupled from the input signal source 86. On the other hand, the transmission gate 50 is biased on to couple or lock the inverters 10 and 20 into a flip-flop arrangement and thereby provide static storage of information. In addition, the transmission gate 60 is biased on whereby the output of the flip-flop (output capacitance node 14 of inverter 10) is operatively coupled to the input capacitance node 33 of the inverter 30.

Also prior to the interval *T1a*, the flip-flop inverters 10 and 20 are considered to be in the state where the output capacitance nodes 14 and 24 are at 0 volt and $+V_O$ volts, respectively. This state of the flip-flop corresponds to IGFET's 12 and 21 being turned on and IGFET's 11 and 22 being turned off. Due to the turned-on condition of transmission gate 60, the input capacitance node 33 of inverter 30 is at 0 volt. The output or load capacitance $C_L$ is therefore charged to a value of $+V_O$ volts as illustrated by the output signal $e_O$ waveform in FIG. 2. The turned-on IGFET 12 provides a discharge path to ground for the nodes 14 and 23 as well as for the node 30 via transmission gate 60. The turned-on IGFET 21 provides a charge path for maintaining the charge of $+V_O$ volts at the node 24 as well as the node 13 via turned-on transmission gate 50.

The input signal $e_{in}$ prior to the interval *T1a* is also at the higher level of $+V_O$ volts. During the interval *T1a* the clock signal CP changes from $+V_O$ volts to 0 volt. The transmission gates 50 and 60 are turned off such that the inverter 30 is decoupled from inverter 10 and the output node 24 of inverter 20 is decoupled from the input node 13 of inverter 10. The inverter 10 is now conditioned to receive information without disturbance or instability from the output node 24 of inverter 20. It should also be noted at this point that the decoupling of inverter 10 from inverter 30 permits the transfer of information from inverter 30 to the load capacitance $C_L$ without interference caused by any change in the state of inverter 10. Also during the interval *T1a* the transmission gate 40 is turned on to couple the output level ($+V_O$ volts) from the signal source 86 to the input capacitance node 13 of inverter 10. Since the capacitance node 13 is already charged to $+V_O$ volts, there is no change in the state of the inverter 10. Since there is no change in the state of inverter 10, there is no change in the state of the inverter 20.

During the ensuing interval *T2a* the clock signal CP returns to the $+V_O$ volts level. The transmission gate 40 turns off to decouple the inverter 10 from the input signal source 86. The transmission gate 50 turns on to clock the inverters 10 and 20 into the flip-flop storage circuit; and the transmission gate 60 turns on to connect the flip-flop output (node 14) to the input node 33 of the inverter 30. Since there was no change in the condition of inverter 10 during interval *T1a*, there is no change in the condition of inverter 30 during the interval *T2a* such that the output signal $e_O$ remains at $+V_O$ volts. Thus, the $e_{in}$ signal value of $+V_O$ volts has been translated by the signal translating stage to the output capacitance node 34 under control of the clock signal CP.

During the *T2a* interval the input signal $e_{in}$ is shown in FIG. 2 to change from the $+V_O$ volts value to a 0 volt value. This can be caused, for example, by a change in state of the preceding stage in a shift register application. During the next interval *T1b* the clock signal CP again changes to a 0 volt. The transmission gates 50 and 60 turn off while transmission gate 40 turns on. The input capacitance node 13 of inverter 10 discharges from $+V_O$ volts to 0 volt via the transmission gate 40 and the low impedance of signal source 86. The inverter 10 thus changes state whereby the IGFET 12 is turned off and the IGFET 11 is turned on. The output capacitance node 14 of inverter 10 as well as the input capacitance node of inverter 20 then charges to $+V_O$ volts. The inverter 20 then also changes state such that its output node 24 changes to 0 volt.

It should be noted at this point that the inverter 30 is unaffected by the switching of inverters 10 and 20 during the interval *T1b* since transmission gate 60 is turned off. This is important because in most applications (as, for example, shift registers) the information stored on the input capacitance *C33* for inverter 30 is being transferred during the interval *T1b* to the load capacitance $C_L$. That is, inverter 30 is driving the next stage. Without the isolation afforded by the off transmission gate 60 timing problems could arise resulting in the transfer of erroneous information. During the next interval *T2b* the clock signal CP returns to the $+V_O$ volts level. The transmission gate 40 turns off while the transmission gates 50 and 60 turn on. The turned-on transmission gate 50 locks the inverters 10 and 20 into a static storage circuit; and the transmission gate 60 couples the input capacitance node 33 of inverter 30 to the flip-flop output node 14. The input capacitance *C33* for inverter 30 then charges from 0 volt to $+V_O$ volt by way of the transmission gate 60 and the turned-on IGFET 11 in inverter 10. The IGFET 31 then turns off and IGFET 32 turns off to discharge the load capacitance $C_L$ to 0 volt. Thus, at the conclusion of the time interval *T1b* the $e_{in}$ signal level of 0 volt has been translated to the output node 34 of the signal translating stage. Succeeding changes in input signal voltage $e_{in}$ are similarly translated by the stage under control of the clock signal CP.

It should be noted that the maximum for time interval *T1a* or *T1b* is limited by the leakage of the turned-off transmission gate 60. That is, the input capacitance *C33* of inverter 30 and the leakage of transmission gate 60 comprise a charge-discharge path which places allowable design limits on the width of the first interval $T_1$ of the clock cycle. On the other hand, there is no limit on the width of the second interval $T_2$ of the clock cycle since the information is statically locked into a flip-flop storage by the turned-on transmission gate 50.

As shown in FIG. 1 the inverters 10 and 20 form the secondary storage element of the stage while the input capacitance *C33* of inverter 30 provides the primary storage element for the stage. However, the order in which the inverter capacitance storage and the flip-flop storage occur is merely a matter of choice in partition. For example, in a shift register of plural cascaded stages the stages could be partitioned such that the flip-flop (inverters 10 and 20) is the primary storage element, and the inverter input capacitance *C33* is the secondary storage element.

It should be further noted at this point that the transmission devices 40, 50 and 60 need not be complementary ones in the sense as illustrated. For example, IGFETs 45, 51 and 61 as well as the inverter 70 could be eliminated. However, the elimination of these IGFETs would result in signal degradation due to cutoff of an IGFET operating in the source follower mode, as pointed out in the aforementioned Burns et al. application. In cases where the component count is critical, the single IGFET transmission gate could be overdriven by the clock signal CP, to improve operation, i.e., the CP signal would have a positive peak value greater than $+V_O$ volts and a negative peak value less than 0 volt for the illustrated values of operating bias. The positive overdrive would assure coupling of full value of the signal through N-type transistors 55 and 65 in transmission gates 50 and 60 and the negative overdrive would assure coupling of the full value of the signal through P-type transistor 41 in transmission gate 40.

The signal translating stage as illustrated in FIG. 1 is noninverting, i.e., the output signal $e_O$ follows the input signal $e_{in}$. Thus, in shift register applications where an even number of stages are employed the serial output of the register is noninverted. To obtain an inverted output an odd number of stages would be employed. However, this order could be reversed by using the output node 24 of inverter 20 rather than the output node 14 of inverter 10 for connection via the transmission gate 60 to the capacitance node 33 of inverter 30.

Figure 3:
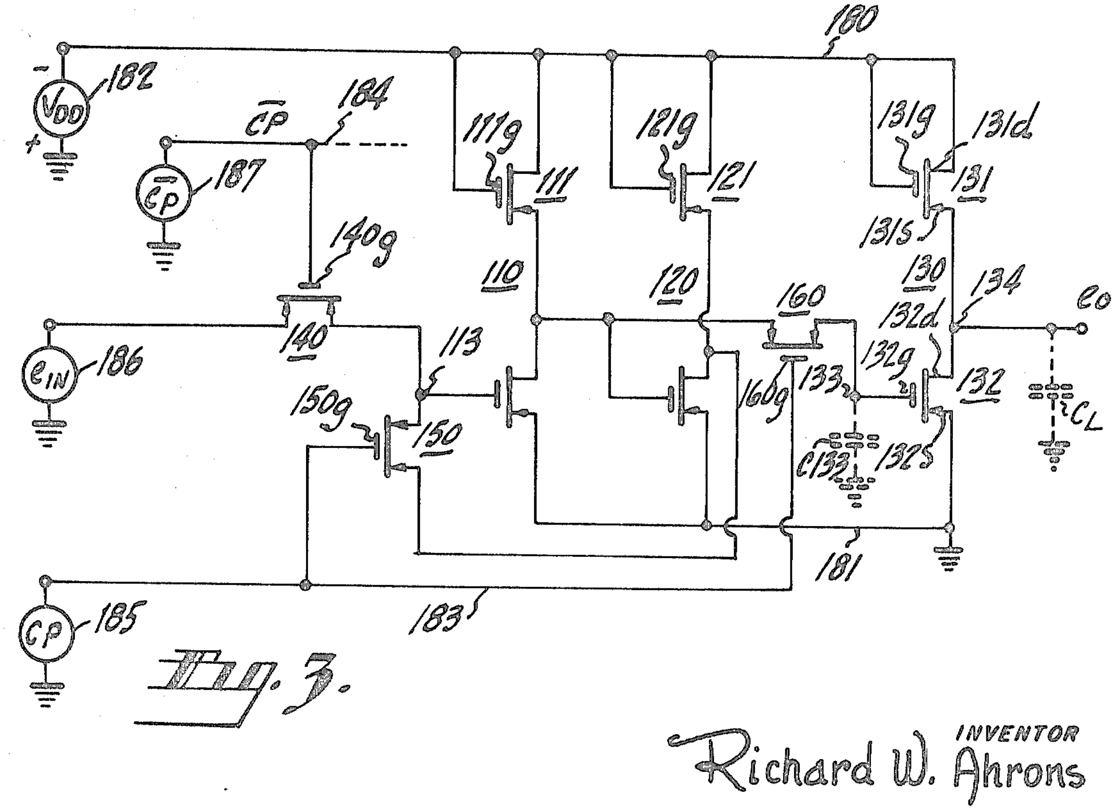
FIG. 3 is a circuit diagram of another example of the invention employing IGFETs of one conductivity type only.

Referring, now, to FIG. 3, there is illustrated another example of a signal translating stage according to the invention which employs IGFETs of a single conductivity type, which for illustrative purposes have been shown as P-type units. The FIG. 3 stage is substantially similar in circuit construction and operation as the FIG. 1 stage insofar as the flip-flop storage, inverter input capacitance storage, and transmission gate operation is concerned. In fact, the complementary inverters and transmission devices of FIG. 1 are merely replaced by P-type IGFET inverters and transmission devices in FIG. 3. Thus, the inverters 110, 120, 130 and 170 in FIG. 3 correspond to inverters 10, 20, 30 and 70 in FIG. 1; transmission devices 140, 150 and 160 in FIG. 3 correspond to transmission devices 40, 50 and 60 in FIG. 1.

Single conductivity type IGFET inverters are well described in the aforementioned Ahrons et al. Patent for the case of N-channel type units. The P-channel type IGFET inverters are substantially similar. For example, the inverter 130 has a first P-type IGFET 132 which is connected in the common source configuration. To this end, the gate lead 132*g* is connected to the input capacitance node 133 for inverter 130. The source lead 132*s* is connected to the grounded supply line 181 while the drain lead 132*b* is connected to the output capacitance node 134. The P-type IGFET 131 serves as a load device for the common source or inverting IGFET 132. To this end, IGFET 131 has its source lead 131*s* connected to the capacitance node 134 and its drain lead 131*d* connected to the supply line 180. The gate lead 131*g* is also shown as connected to the supply line 180. The supply line 180 is maintained more negative than the supply line 181 by means of the bias source 182, which has its negative terminal connected to the supply line 180 and its positive terminal connected to circuit ground. The bias source 182 has a value of $V_{DD}$ volts. Alternatively, the gate lead 131*g* could be returned to some other suitable negative voltage. In order to establish the proper voltage level at the output capacitance node 134 for the condition where the IGFET 132 is turned on, transconductance ($g_m$) for the IGFET 132 is generally larger than the $g_m$ for the device IGFET 131. The other inverters 110, 120 and 170 are substantially similar in circuit configuration to the inverter 130.

The transmission devices 150 and 160 are turned on and off by the clock signal CP which applies clock signals to their respective gate leads 150*g* and 160*g* by way of the CP clock line 183. As illustrated the clock signal complement $\overline{CP}$ is obtained from a $\overline{CP}$ clock signal source 187. The clock signal complement $\overline{CP}$ is applied to the gate lead 140*g* of transmission gate 140 by way of the $\overline{CP}$ clock line 184. Like its counterpart (reference character 40) in FIG. 1 the transmission device 140 is utilized to couple and decouple the source 186 of input signals $e_n$ to and from the input capacitance node 113 of inverter 110.

Figure 4:
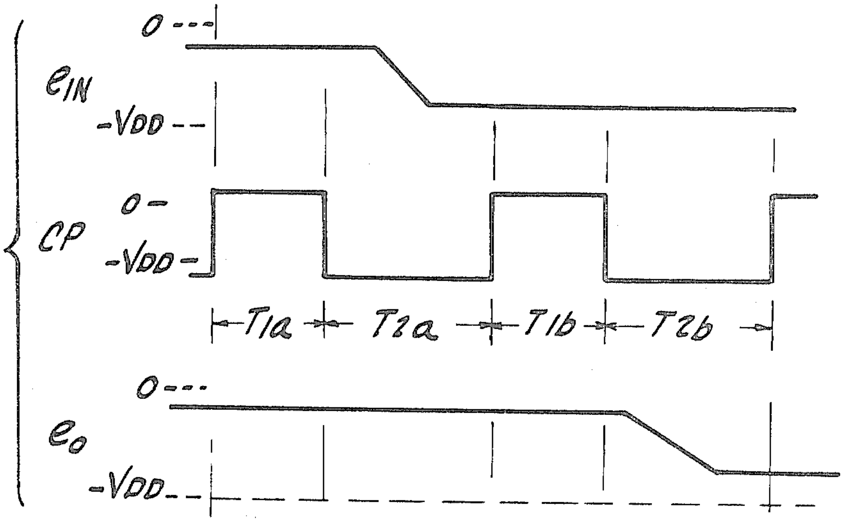
FIG. 4 is a waveform diagram of the clock signal, the input signal and the output signal for the FIG. 3 signal translating stage.

In the waveform diagram of FIG. 4 the waveforms for the input signal $e_{in}$ and output signal $e_O$ are substantially similar to the $e_{in}$ and $e_O$ waveforms in FIG. 2; the clock waveform CP is inverted from the one shown in FIG. 2 so that there is a correspondence between the time intervals *T1* and *T2* in both FIGS. The logic or signal levels for the FIG. 3 circuit approach 0 volt and $-V_{DD}$ volts, as illustrated by the waveforms for $e_{in}$ and $e_O$ in FIG. 4. The clock signal CP waveform is shown to overdrive the signal levels in order to assure transmission gate coupling of the full value of the signal. That is, the peak value of the CP clock signal exceeds $V_{DD}$ volts, as illustrated in FIG. 4. It should be noted that the peak value of the CP signal should also exceed $V_{DD}$ volts. In all other respects the FIG. 3 signal translating stage operates similar to the FIG. 1 stage to translate the $e_{in}$ input signals to its output capacitance node 134.

The dashed connections for the $\overline{CP}$ clock line 184 are employed to indicate that the $\overline{CP}$ line may service or be common to serve signal translating stages.

I claim:

1. A signal translating stage operable during first and second consecutive time intervals to translate information signals from the input terminal to the output terminal of said stage comprising:

means providing a clock signal having first and second successive and nonoverlapping time intervals during which it is at different voltage levels;

first, second and third semiconductor inverter devices, said first and second inverter device cross-coupled to form a flip-flop and having an input terminal and an output terminal to thereby form a first storage circuit for statically storing said information;

a second storage circuit responsive to and in cooperation with said clock signal for storing charge dynamically, consisting solely of said third inverter device having an output terminal and an input terminal which exhibits a predominantly capacitive, relatively high input impedance;

first transmission gate means responsive to said clock signal for coupling the input terminal of said stage to the input terminal of one of said storage circuits only during said first time intervals;

second transmission gate means responsive to said clock signal for coupling the output terminal of said one storage circuit to the input terminal of the other storage circuit only during said second time intervals; and means for coupling the output terminal of said other storage circuit to the output terminal of the stage.

2. The combination as claimed in claim 1:

wherein said first transmission gate means includes a first transistor and wherein said second transmission gate means includes a second transistor, each transistor having a conduction path; and wherein the conduction path of said first transistor is coupled between the input terminal of said stage and the input terminal of one of said storage circuits and wherein the conduction path of said second transistor is coupled between the output terminal of said one storage circuit and the input terminal of the other storage circuit.

3. The invention according to claim 2 wherein said translating stage further includes a third transmission gate having a conduction path coupled in the first storage circuit between the input of the first inverter and the output of the second inverter.

4. The invention according to claim 3 wherein the transmission gate means further includes clock signal means for turning the first transmission gate on and the second and third transmission gates off during the first time interval and for turning the first transmission gate off and the second and third transmission gates on during the second time interval.

5. The invention according to claim 4 wherein the first and second storage circuit correspond to said one and said other storage circuit, respectively.

6. The invention according to claim 5 wherein the inverters and transmission gates are comprised of insulated gate field-effect transistors of one conductivity type.

7. The invention according to claim 5 wherein the inverters and transmission gates are comprised of insulated gate field-effect transistors of opposite conductivity type.